April 13, 1943.  R. E. WHITE ET AL  2,316,480
FLAT-TOP SLUSH PUMP VALVE
Filed Aug. 3, 1940  2 Sheets-Sheet 1
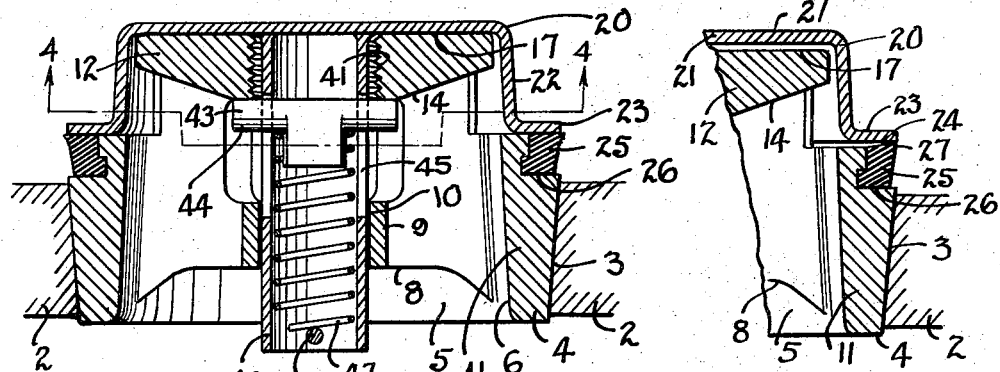
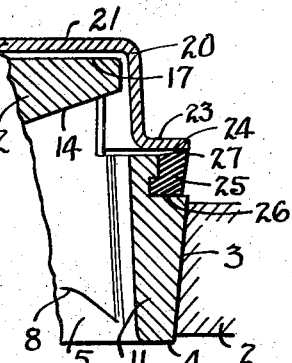
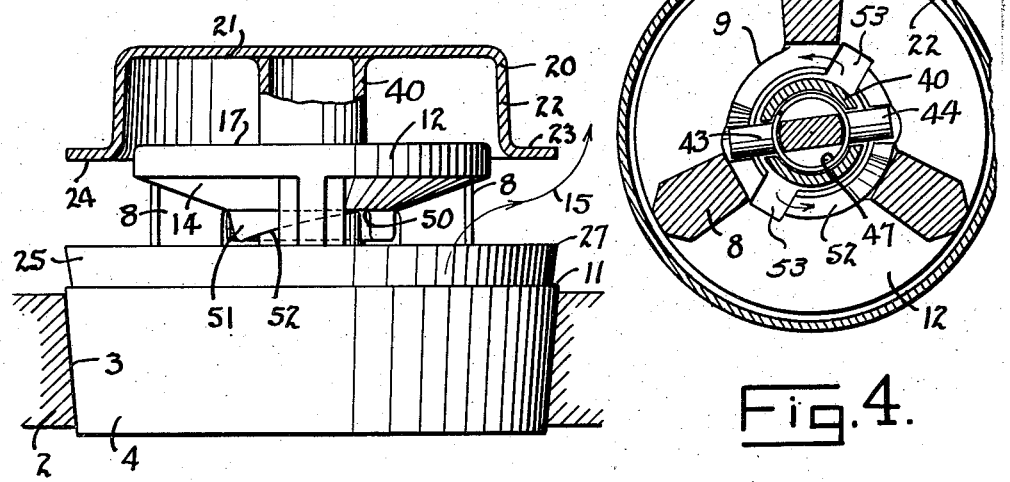
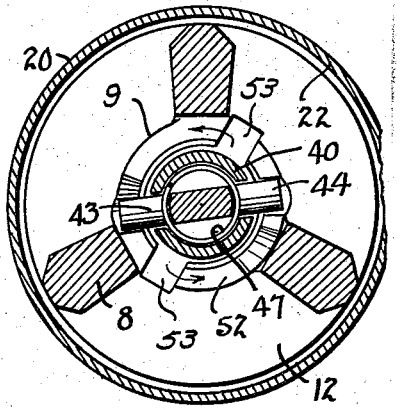
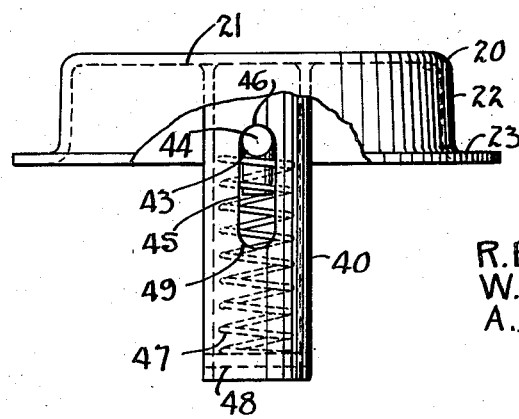
R.E. WHITE
W.E. LILJESTRAND
A.S VOLPIN
INVENTORS
Lester B. Clark
ATTORNEY.

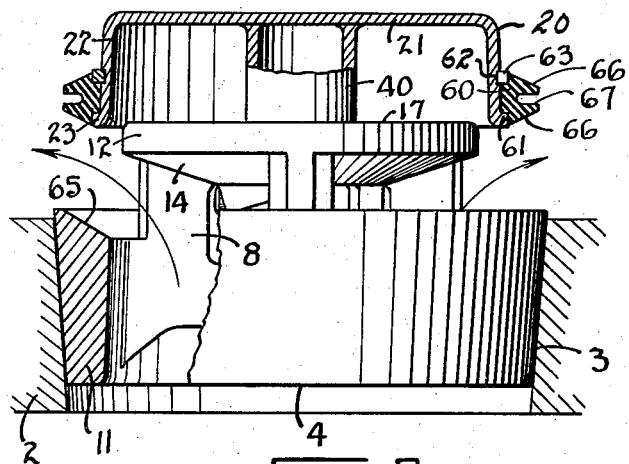
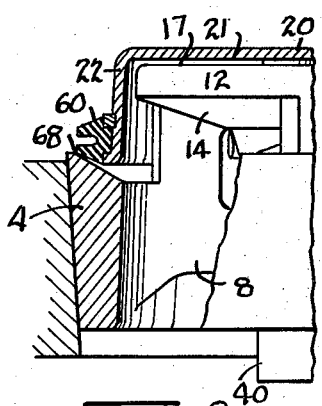
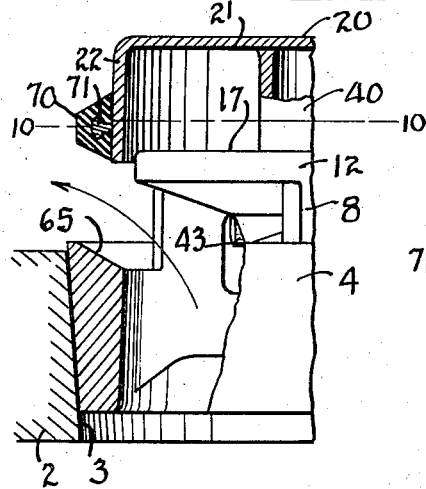
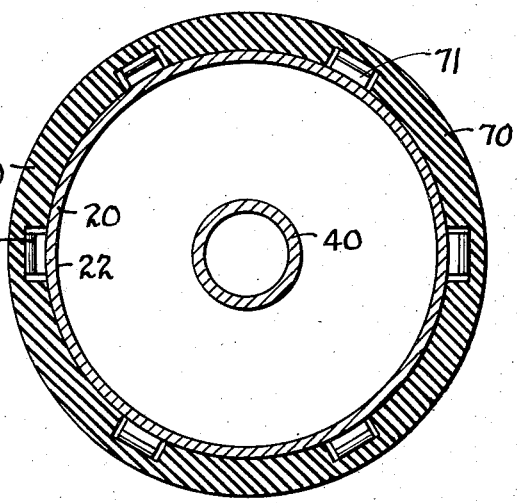
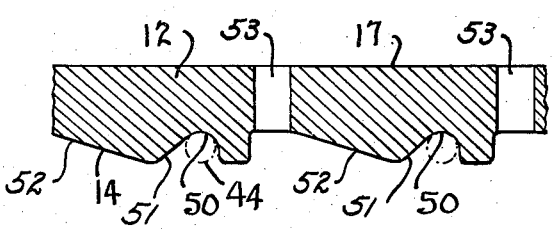

Patented Apr. 13, 1943

2,316,480

UNITED STATES PATENT OFFICE 2,316,480

FLAT-TOP SLUSH PUMP VALVE

Richard E. White, Walter E. Liljestrand, and Alexander S. Volpin, Houston, Tex., assignor to Mission Manufacturing Company, a corporation Application August 3, 1940, Serial No. 350,832

1 Claim. (Cl. 251—144)

The invention relates to slush pump valves of the type used in controlling the flow of drilling mud or slush through the pumps in the rotary method of drilling wells.

In pumps of this type the valve is subjected to a pressure from below in opening and when this pressure ceases the pressure on the upper side thereof will cause the valve to close sharply. When it is considered that pressures as high as 2,000 pounds per square inch are maintained within the pump, it will be obvious that the rap upon closing of the valve will be tremendous. Thus, if a valve should have thirty square inches of exposed area the thrust to be stopped when the valve closes, if the pressure were 2,000 pounds per square inch, would be 60,000 pounds. When it is considered that these pumps operate at from thirty to sixty strokes per minute it is apparent that a very substantial structure must be provided in order to withstand the shock of the closing of the valve.

With the foregoing facts in mind, the present valve contemplates a very large stop area for contact between the seat and the valve member so that the force of stopping the valve will be distributed over a large area and the unit area pressure between the stop parts thereby reduced.

It is one of the objects of the invention to provide a valve seat with an upstanding head to receive and stop the valve member.

Another object of the invention is to provide a flat top valve member which is adapted to engage a cooperating flat top stop member in the valve seat.

Another object of the invention is to provide engagement means between the valve and seat to limit the upward movement of the valve.

Still another object of the invention is to provide an inverted cup-shaped valve member having a large, flat area by which the valve member is stopped and a depending flange provided to accomplish the sealing of the valve member with the seat.

Another object of the invention is to provide a removable and reversible seal ring for a slush pump valve.

Other and further objects of the invention will be readily apparent when the following description is considered in connection with the accompanying drawings, wherein:

Fig. 1 is a vertical sectional view of the flat top valve shown in sealing position.

Fig. 2 is a broken section showing the valve about to close.

Fig. 3 shows a side elevation of the valve seat and stop with the valve member in open position.

Fig. 4 is a section taken on the line 4—4 of Fig. 1.

Fig. 5 is a side elevation of the valve member and its guide stem.

Fig. 6 is a sectional view of a layout of the locking means to retain the valve member in position.

Fig. 7 shows the valve in open position and being provided with a modified form of sealing ring.

Fig. 8 is a broken section showing the valve of Fig. 7 about to close.

Fig. 9 shows still another modified form of seal ring applied to a valve in open position.

Fig. 10 is a section taken on the line 10—10 of Fig. 9.

In Fig. 1 the pump body is illustrated generally at 2, and has the opening 3 therein to receive the seat ring 4. The opening 3 and the seat ring are tapered so as to form a drive fit between the ring and the pump body.

The ring 4 has a vertical passage 5 therethrough which is shown in Fig. 1 as being upwardly tapered. Extending inwardly from the wall 6 of the ring are the wings or spider arms 8, three of which have been provided. These wings join together at a boss 9 which has a guide opening 10 therethrough. Particular attention is directed to the configuration of the wings 8 which extend upwardly beyond the upper end of the annular body portion 11 of the ring 4. These wings are formed integral with a head or stop means 12 which is in the form of a flat plate having an area of substantially the same as that of the passage 5. The lower face 14 of this head is tapered to facilitate the flow of fluid through the passage 5 and outwardly around the head as indicated by the arrow 15 in Fig. 3. The upper surface or area of this head 12 is in the form of a flat surface 17 which is arranged to receive, stop and support the valve member 20.

The valve member is of peculiar construction, as best seen in Figs. 1, 3 and 5, in that it is in the form of an inverted cup, or might be said to be of an inverted dished configuration. The valve member has a flat top portion 21 which is slightly greater in diameter than the head 12 and is adapted to be supported upon the head when the valve is in closed position, as seen in Fig. 1. The valve member 20, however, has a downwardly extending rim 22 which terminates in a flange 23 which is outstanding beyond the rim. The flange 23 has the contact face 24 thereon which is arranged to seal with the resilient seal ring 25 mounted in the groove 26 in the upper outer edge of the body 11 of the seat ring 4, as will be seen in Fig. 2.

This flange 23 and the face 24 are arranged to engage the outer edge 27 of the resilient ring 25 as the valve member approaches the stop head 12, and it will be noted that the flat top 21 has not quite contacted the stop surface 17 of the head 12 as seen in Fig. 2. Thus, it might be said that the sealing face 24 engages the edge 27 of the resilient ring just before the valve member is stopped by the head 12. Of course, if wear should occur upon the ring 25 the sealing action would more closely approach the time when the stopping of the valve member occurred. It is the intention, however, that in the operation of the valve that the seal will be formed at just about the same time that the stopping of the valve member occurs, but it is important to note that the stopping action occurs over the large exposed metal area of the head 12 which receives a complementary area on the inside of the flat top 21 of the valve member so that the rap of stopping the valve is absorbed by these parts so as to transmit a direct thrust from the valve member to the valve seat ring, and that the sealing action has been separated from the stopping construction so that there will be no excessive pressure on the resilient material used to form the sealing. In this manner exceptionally long and satisfactory service of the parts is obtained because the stopping is accomplished by a large distribution of the applied force and the seal action obtained with only sufficient pressure to accomplish the seal.

In order to guide the valve member in its reciprocating movement from the position of Fig. 1 to that of Fig. 3, and vice versa, a guide stem 40 has been affixed to the flat top 21 and this stem projects downwardly into the opening 10 of the guide bushing 9 and also projects through an opening 41 in the head 12 and is arranged for sliding movement through the head or spider.

In order to limit the upward movement of the valve member relative to the seat so as to retain the valve in position against the flow of liquid through the valve, a crossbar 43 is shown as carried by the stem 40. This bar has the end portions 44 which project through the slots 45 in the sides of the guide stem 40. This crossbar may be inserted through the stem and the ends projected through the slots 45 as desired, but it is intended that the crossbar will be mounted in contact with the upper end 46 of the slot 45 by means of a spring 47 abutting against the crossbar and with its lower end against a pin 48. This spring is intended to be of sufficient strength to support the cross pin in this position.

This cross pin 43 is intended to abut the under surface 14 of the head 12 at all times so that when the valve member moves upwardly and the lower end 49 of the slot 45 comes in contact with the ends 44 of the crossbar, further movement of the valve member will be stopped. In order to insure that the valve member will be retained in its proper position without rotation, and in order that this locking or latching bar may be inserted, the head 12 has been provided with a cross slot 53 which permits the crossbar to move downwardly through the head as the stem 40 is inserted through the opening 41. The opening 41 is threaded to receive a tool in setting and removing the valve seat ring 4.

As seen in Fig. 6, the lower face 14 of the head 12 is provided with sockets 50 on diametrically opposite sides thereof and a cam surface 51 projects below the face 14 of the head. This cam surface has an inclined trackway 52 thereon adjacent the slot 53 in the head. Thus, when the guide stem 40 is moved downwardly into the bushing 9 and the cross pin 43 moves down into the slot in the head, the ends 44 of the cross pin will be moved below the surface 14. The valve member is now rotated or turned a part of a revolution which carries the ends 44 of the cross pin along the inclined face 52 of the cam 51 until the ends move into the sockets 50. The spring 47 meanwhile urges the crossbar upwardly until it snaps into the sockets 50. Once the crossbar is positioned it will be locked or latched so as to be so retained.

Figs. 7 and 8 show a modified form of a seal ring in that the ring 60 is mounted on the rim 22 of the valve 20. The flange 23 has been shortened somewhat to form a shoulder 61 against which the ring 60 will abut. An annular groove 62 in the outer face of the rim 22 will receive a spring ring 63 to be snapped into position after the resilient seal 60 has been positioned. In this manner the resilient ring may be readily replaced by merely removing the snap ring.

It should be noted that a tapered sealing face 65 is provided on the seat body 11 and that the seal ring 60 has a complementary inclined face 66. The ring 60 is shown as reversible due to a similar inclined face 66 on the opposite side. A groove or recess 67 allows flexing of the seal ring to provide a seal, as seen in Fig. 8. A contact at 68 is the first engagement between the faces 65 and 66, so that a seal is accomplished at about the time that the head 12 stops the valve member as described in connection with Fig. 1.

Figs. 9 and 10 show another modified form of the sealing ring wherein the ring 70 is affixed to the rim 22 by being passed over the outstanding lugs 71. These lugs may be welded on the rim as seen in Fig. 10, and the ring 70 may be either moulded directly over these lugs or moulded with the recesses to receive the lugs as desired. If the ring is removable it can be readily replaced, whereas if it is permanently moulded in position, the whole valve member will have to be removed in order to renew the ring. Either form may be used, depending upon the circumstances encountered.

The particular advantages of the present structure reside in the fact that a relatively large fluid passage thru the valve is provided due to the arrangement of the three relatively narrow arms which are so arranged that the metal thereof is in shear rather than bending stress, a large striking surface for the cap member is provided so as to stop the valve and the fact that the valve may be very light in weight so as to avoid excessive pounding and resistance to flow.

Broadly, the invention contemplates a flat top slush pump valve wherein a large stop surface is provided and wherein the parts are readily removable and renewable.

What is claimed is:

In a slush pump valve assembly, a seat ring having a seat thereon, a valve member, a guide way on said ring, a guide stem on said member for cooperation with said guide way, a stop head on said ring above said seat to arrest downward movement of said valve member, a stop seat on said member for cooperation with said stop head, a means to limit the upward movement of said member relative to said ring seat including means movably carried by said stem and movable relative thereto, a resilient means normally urging said limiting means against said stop head.

RICHARD E. WHITE.
WALTER E. LILJESTRAND.
ALEXANDER S. VOLPIN.